United States Patent
Yamagata

[19]

[11] Patent Number: 6,002,877
[45] Date of Patent: Dec. 14, 1999

[54] INTERRUPT CONTROL METHOD FOR CONTROLLING AN INTERRUPT FROM A PERIPHERAL DEVICE TO A PROCESSOR

[75] Inventor: Koki Yamagata, Kawasaki, Japan

[73] Assignee: Fujitsu Limited, Kawasaki, Japan

[21] Appl. No.: 08/905,857

[22] Filed: Aug. 4, 1997

Related U.S. Application Data

[63] Continuation of application No. 08/347,827, Dec. 1, 1994, abandoned.

[30] Foreign Application Priority Data

Mar. 23, 1994 [JP] Japan .................................. 6-051458

[51] Int. Cl.[6] ........................................................ G06F 9/46
[52] U.S. Cl. ............................ 395/738; 395/870; 395/742
[58] Field of Search .................................... 395/868–870, 395/733–742

[56] References Cited

U.S. PATENT DOCUMENTS

| | | | |
|---|---|---|---|
| 5,287,523 | 2/1994 | Allison et al. | 395/870 |
| 5,448,743 | 9/1995 | Gulick et al. | 395/869 |
| 5,471,620 | 11/1995 | Shimizu et al. | 395/375 |
| 5,481,725 | 1/1996 | Jayakumar et al. | 395/868 |

FOREIGN PATENT DOCUMENTS

| | | | |
|---|---|---|---|
| 63-271537 | 11/1988 | Japan | G06F 9/46 |
| 4-373056 | 12/1992 | Japan | G06F 13/362 |
| 1544954 | 4/1979 | United Kingdom | G06F 9/18 |
| 2147719 | 5/1985 | United Kingdom | G06F 9/46 |

*Primary Examiner*—Glenn A. Auve
*Attorney, Agent, or Firm*—Greer, Burns, & Crain, Ltd.

[57] ABSTRACT

A method for controlling an interrupt from a peripheral device to a processor, the peripheral device including at least an interrupt control unit, an interrupt request level holding unit, and an interrupt vector holding unit, which includes the steps of: a) updating the contents of the interrupt request level holding unit in accordance with commands in a software sent from an external device, for example, a subprocessor; b) updating the contents of the interrupt vector holding unit in accordance with commands in the software sent from the external device; c) reading an interrupt request level from the interrupt request level holding unit to the interrupt control unit; d) issuing the interrupt request level from the interrupt control unit to the processor when the peripheral device performs the interrupt operation; e) performing various processes and asserting the results of the signal processes from the processor to the peripheral device; f) reading an interrupt vector from the interrupt vector holding unit to the interrupt control unit, and setting a vector number to lower byte of data to assert data and a size acknowledgment; g) notifying the interrupt vector from the interrupt control unit to the processor; i) latching the vector number and negating address and data strobes in the processor; k) negating the data and the size acknowledge in the interrupt control unit; and l) starting the next cycle of the interrupt operation in said processor.

4 Claims, 7 Drawing Sheets

INTERRUPT CONTROL METHOD FOR CONTROLLING AN INTERRUPT FROM A PERIPHERAL DEVICE TO A PROCESSOR

This application is a continuation of application Ser. No. 08/347,827 filed on Dec. 1, 1994, now abandoned.

BACKGROUND OF THE INVENTION

1. Field of the Invention

The present invention relates to an interrupt control method for controlling an interrupt from a peripheral device, such as an input/out device, to a processor.

2. Description of the Related Art

In a computer system formed of a processor and a plurality of peripheral devices, such as an input/output device, various interrupt control methods are known for executing a predetermined instruction after an interrupt is sent from a peripheral device to the processor. In general, the interrupt operation is started in accordance with the transmission of an interrupt request and an interrupt vector from the peripheral device to the processor, and executed based on an interrupt acknowledge by the processor.

Recently, since the performance of computers has generally increased, it is very important to realize effective interrupt operation in order to increase the throughput of a system.

In a conventional art, the Japanese Unexamined Patent Publication (KOKAI) No. 63-271537 and No. 4-373056, have disclosed as two representative methods as explained below.

The former (JPP-63-271537) discloses an interrupt controller which can change the interrupt vector generated by a numerical operation processor. That is, in a computer system including a microprocessor and a numerical operation processor, interrupt vectors were previously fixed and only fixed interrupt vectors were sent from the numeral operation processor to the microprocessor. However, according to this citation, an interrupt controller is newly provided between the microprocessor and the numerical operation processor so that it is possible to change the interrupt vector from the numerical operation processor.

In this case, the citation discloses only a change in the interrupt vector from the numerical operation processor, and it does not disclose a change in the interrupt vector which is required in accordance with the change of the system structure.

The latter (JPP-4-373056) also discloses an interrupt controller which can change the priority order of interrupt requests from a peripheral device. That is, in a computer system including an interrupt controller and a plurality of peripheral devices, the priority order of the interrupt requests from peripheral devices was fixedly determined in a conventional system. However, in this citation, when the interrupt controller simultaneously receives a plurality of interrupt requests from the peripheral devices, the interrupt controller can change the priority order of the interrupt requests in accordance with the frequency of the individual interrupt requests.

In this case, the citation discloses only a change in the priority order of the interrupt requests from the peripheral devices, and does not disclose a change of interrupt request which is required in accordance with the change of the terms of use of the system or the condition of the system in use.

SUMMARY OF THE INVENTION

The object of the present invention is to provide an interrupt control method in which both the interrupt request level and the interrupt vector can be changed in accordance with structural conditions of the system so that it is possible to provide an optimum interrupt operation from the peripheral device to the processor.

In accordance with the present invention, there is provided a method for controlling an interrupt operation from a peripheral device to a processor, and a peripheral device including at least an interrupt control unit, an interrupt request level holding unit, and an interrupt vector holding unit; the method including steps of:

a) updating the contents of the interrupt request level holding unit in accordance with commands in a software sent from an external stage, for example, a subprocessor;

b) updating the contents of the interrupt vector holding unit in accordance with commands in the software sent from the external device;

c) reading an interrupt request level from the interrupt request level holding unit to the interrupt control unit;

d) issuing the interrupt request level from the interrupt control unit to the processor when the peripheral device performs the interrupt operation;

e) performing various processes, such as synchronization of the interrupt request levels, etc., and asserting the result of the processes by the processor to the peripheral device;

f) reading an interrupt vector from the interrupt vector holding unit to the interrupt control unit, and setting a vector number to lower byte of data to assert data and size acknowledge;

g) notifying the interrupt vector from the interrupt control unit to the processor;

i) latching the vector number and negating address and data strobes in the processor;

k) negating data and size acknowledge in the interrupt control unit; and l) starting the next cycle of the interrupt operation in said processor.

In one preferred embodiment, in the processor, the step (e) further includes;

(1) synchronizing the interrupt request levels;

(2) comparing the interrupt request level with a mask level, and waiting for completion of an instruction in progress;

(3) setting the interrupt request level to lower address;

(4) reading read/write level indicating the direction of transfer of data;

(5) setting function codes to "0111" in the interrupt operation;

(6) setting transfer size to "01" in order to indicate one-byte transfer in the interrupt operation;

(7) asserting address and data strobes to "0"; and (8) asserting an interrupt acknowledge strobe to "0".

In another embodiment, the method further includes: a sub-processor for sending an update command in parallel to said interrupt request level holding unit and to the interrupt vector holding means in order to update contents thereof.

DESCRIPTION OF THE PREFERRED EMBODIMENTS

Figure 1:
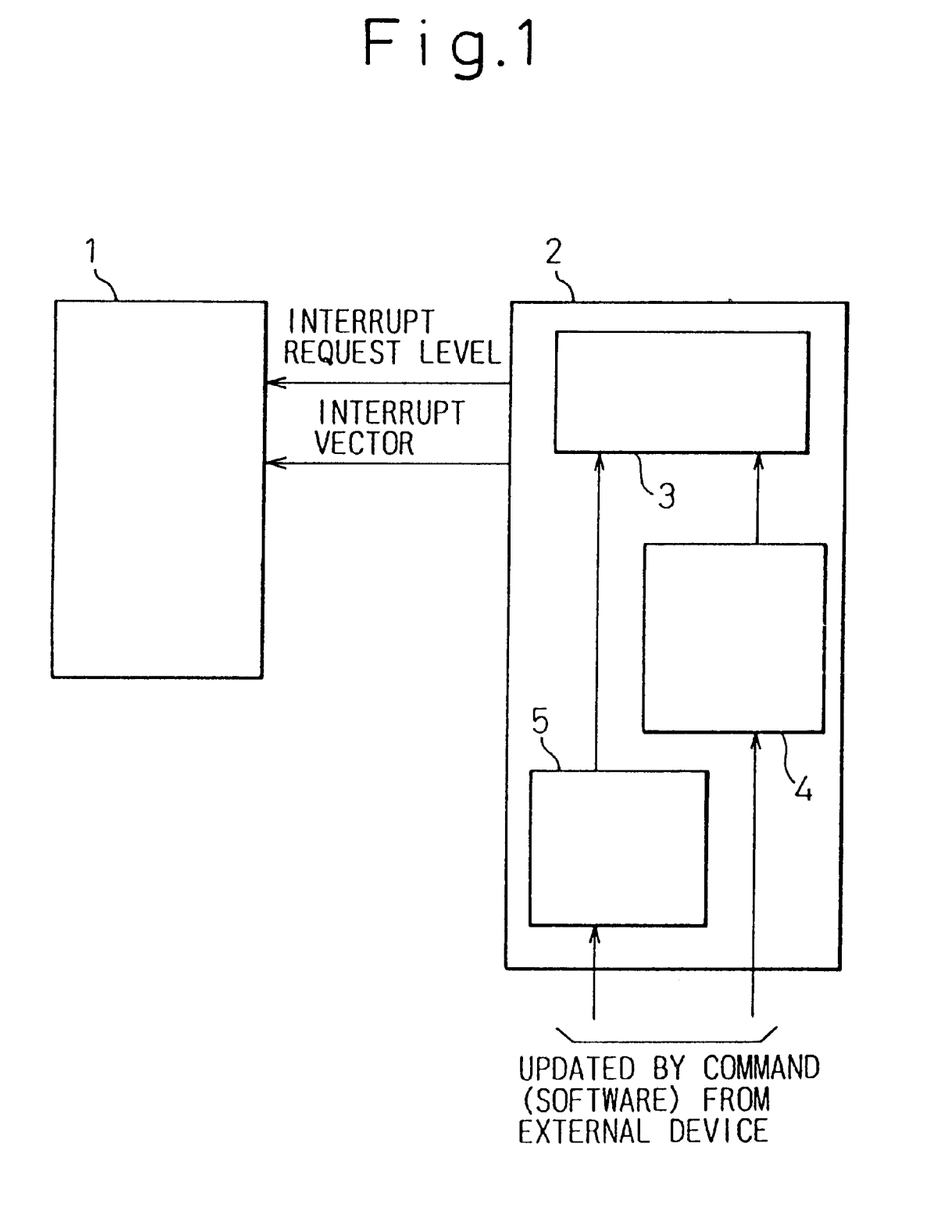
FIG. 1 is a basic structure of a computer system using an interrupt control method according to the present invention.

FIG. 1 is a basic structure of a computer system using an interrupt control method according to the present invention. In FIG. 1, reference number 1 denotes a processor, and reference number 2 denotes a peripheral device including an interrupt control circuit 3, an interrupt request level holding register 4, and an interrupt vector holding register 5.

The contents of the interrupt request level holding register 4 and the interrupt vector holding register 5 are updated by commands (software) from an external device, for example, a sub-processor, in accordance with the structural conditions of the system.

When an interrupt operation occurs in the peripheral device 2, the interrupt control circuit 3 sends an interrupt request level and an interrupt vector to the processor 1 and further notifies the contents of the interrupt request level holding register 4 and the interrupt vector holding register 5 to the processor 1.

Figure 2:
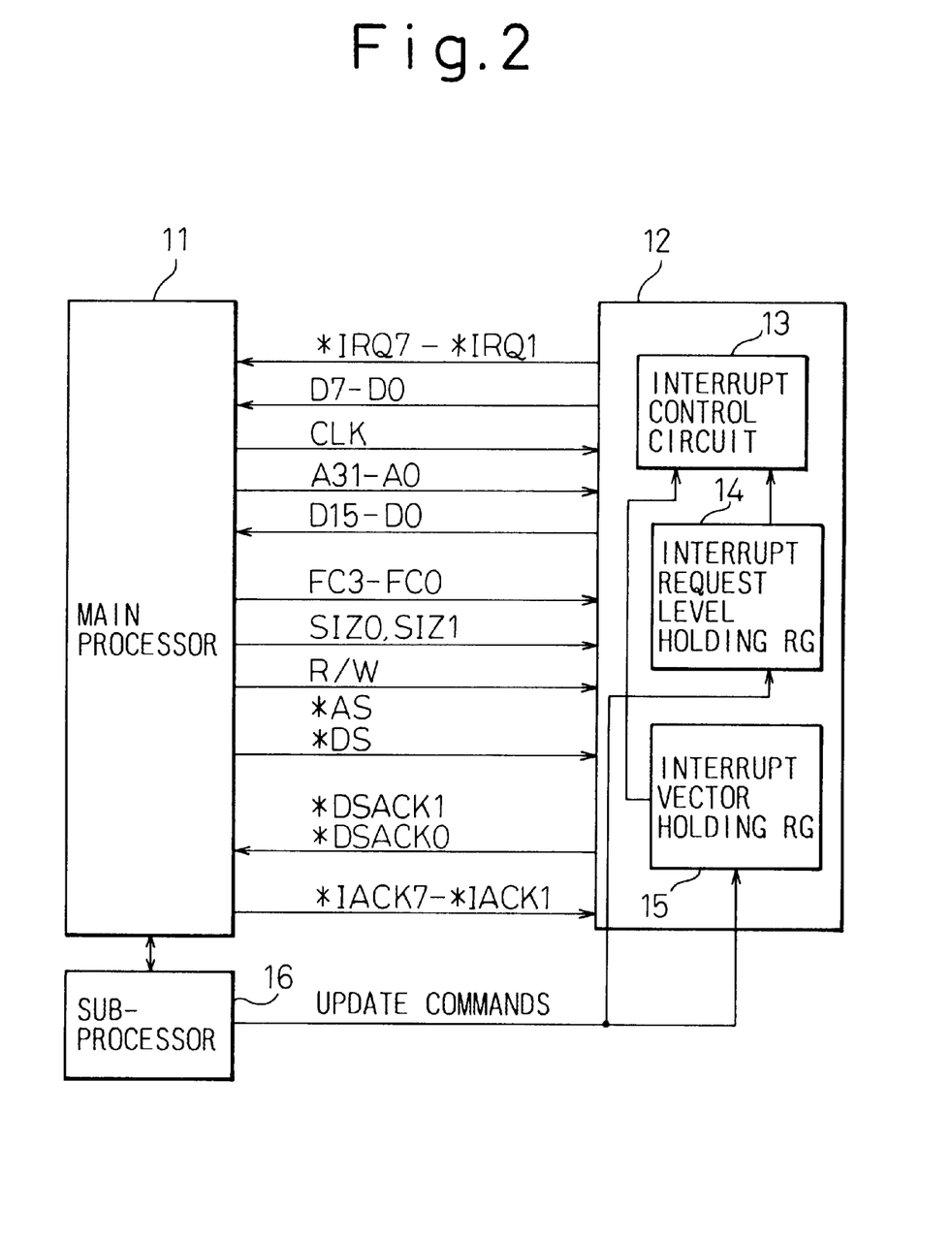
FIG. 2 is an explanatory view of an interrupt control method according to one embodiment of the present invention.

FIG. 2 is an explanatory view of the interrupt control method according to one embodiment of the present invention. In FIG. 2, reference 11 denotes a main processor, 12 a peripheral device, and 16 a subprocessor. The peripheral device 12 includes an interrupt control circuit 13, an interrupt request level holding register 14, and an interrupt vector holding register 15, and these components correspond to the structures of FIG. 1. The main processor 11 is connected to the peripheral device 12 through a bus, and the subprocessor 16 is also connected to the peripheral device 12 through a bus.

The sub-processor 16 sends an update command to the interrupt request level holding register (RG) 14 and the interrupt vector holding register (RG) 15 through the bus in order to update the contents of the interrupt request level holding RG 14 and of the interrupt vector holding RG 15.

The embodiment shown in FIG. 2 can apply to, for example, a mobile radio communication system. In this communication system, the main processor 11 supports a wireless unit and a sound processing unit (both not shown) in a portable terminal (i.e., peripheral device), and the sub-processor 16 supports a key unit and a display unit (both not shown) in the portable terminal.

When the portable terminal detects a key operation by a user, the sub-processor 16 can change the interrupt request level and the interrupt vector in the portable terminal in accordance with an update command so that the main processor 11 performs the interrupt operation in the wireless unit and the sound processing unit.

As shown in FIG. 2, various signals are transferred between the main processor 11 and the peripheral device 12 as explained below.

Reference letters *IRQ7 to *IRQ0 denote eight interrupt request levels sent from the peripheral device 12 to the main processor 11, and it is assumed that the reference letter *IRQ7 has the highest interrupt request level.

D7 to D0 denote interrupt vectors formed by the lower eight bits of the data bus. These interrupt vectors D7 to D0 also are sent from the peripheral device 12 to the main processor 11.

CLK denotes a clock signal used as a reference signal for bus timing (see, FIG. 7) and sent from the main processor 11 to the peripheral device 12. A31 to A0 denote an address bus having bit-width of thirty-two bits (see, FIG. 5). D15 to D0 denote a data bus having bit-width of sixteen bits (see, FIG. 5). The addresses A31 to A0 are sent from the main processor 11 to the peripheral processor 12, and the data D15 to D0 are sent from the peripheral device 12 to the processor 11.

FC3 to FC0 denote function codes, and these codes are set to "0111" in the interrupt operation. SIZ0 and SIZ1 denote transfer sizes, and these are set to the value "01" in the interrupt operation. The value "01" denotes "one byte transfer". Further, the value "10" denotes "word transfer", the value "11" denotes "three bytes transfer", and the value "00" denotes "long word transfer", respectively. These codes and sizes are sent from the main processor 11 to the peripheral device 12.

R/W denotes a read/write signal indicating a transfer direction of the data. The read R is shown by "1", and the write "W" is shown by "0". This signal is sent from the main processor 11 to the peripheral device 12.

Further, *AS denotes an address strobe signal, and *DS denotes a data strobe signal. In a read cycle (see, FIG. 7), the signals *AS and *DS are simultaneously asserted, and the main processor 11 instructs sending of data via the data bus (see, FIG. 5) to the peripheral device 12. On the contrary, in the write cycle, the main processor 11 notifies validity of the data on the data bus to the peripheral device 12 by using the data strobe *DS. *DSACK1 and *DSACK0 denote acknowledge signals sent from the peripheral device 12 to the main processor 11. In the read cycle (see, FIG. 7), the peripheral device 12 instructs the latch of data to the main processor 11 after completion of the bus cycle. In the write cycle, the peripheral device 12 notifies completion of the bus cycle to the main processor 11 when the storage of the data is completed in the peripheral device 12.

For example, when the signals *DSACK1 and *DSACK0 are "11", an inner mediation (i.e., a state waiting for use of the bus) is inserted in the present bus cycle.

Further, when the signals *DSACK1 and *DSACK0 are "10", the bus cycle is completed (bus-width of eight bits).

Still further, when the signals *DSACK1 and *DSACK0 are "01", the bus cycle is completed (bus-width of sixteen bits). Still further, when the signals *DSACK1 and *DSACK0 are "00", this indicates reservation of the bus.

Further, *IACK7 to *ICAK1 denote interrupt acknowledgment, and each indicates a level of an external interrupt during an interrupt acknowledge cycle.

Figure 3:
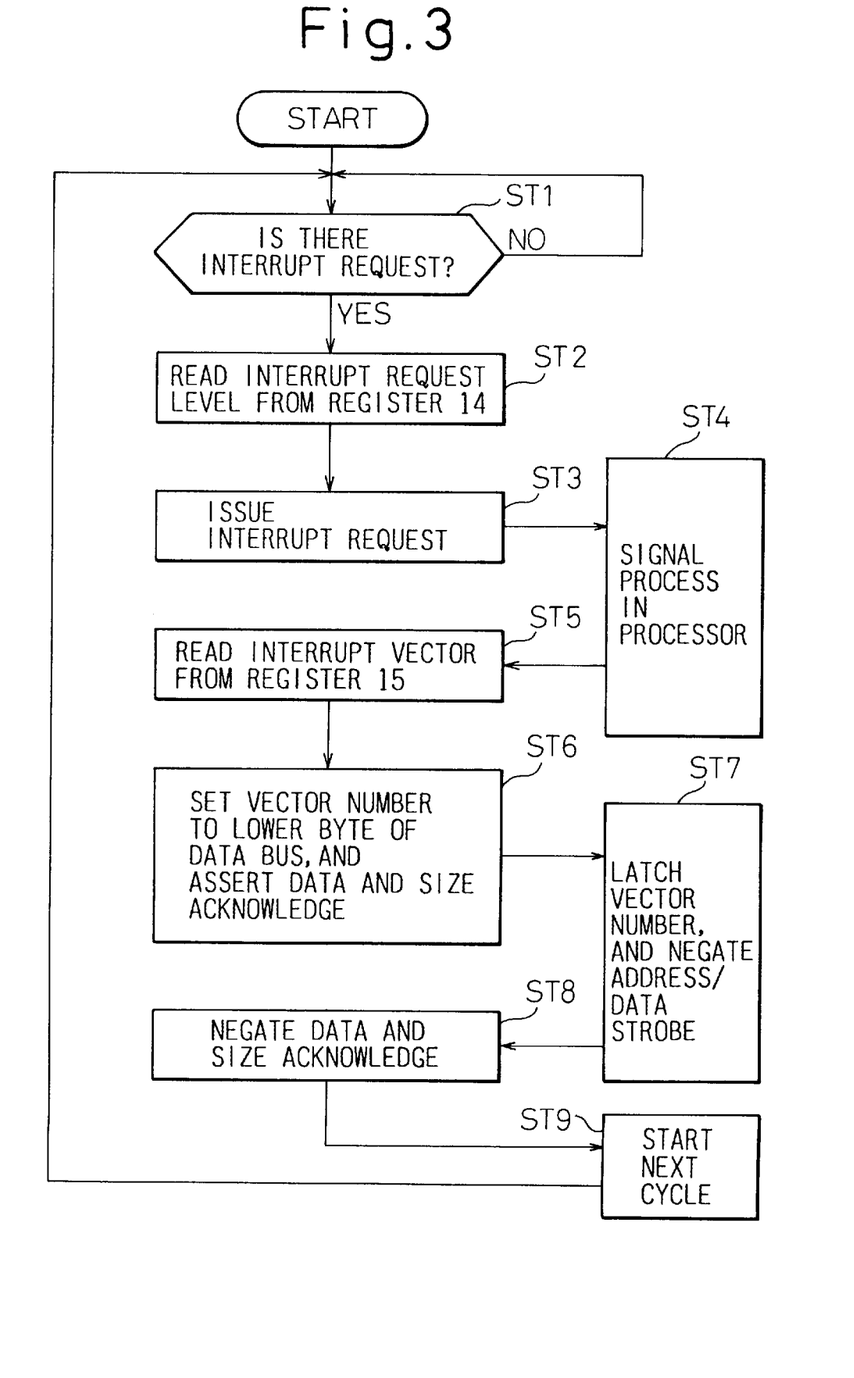
FIG. 3 is a flowchart for explaining the operation of the present invention.

FIG. 3 is a flowchart for explaining the operation of the present invention.

In step ST1, the interrupt control circuit 13 determines whether there is an interrupt request from the peripheral device.

In step ST2, when there is the interrupt request (YES), the interrupt control circuit 13 reads the interrupt request level from the interrupt request level holding register 14. In this case, the sub-processor 16 rewrites the contents of the interrupt request level holding register 14 and the interrupt vector holding register 15 in accordance with the structural conditions by sending the update command formed by the software.

In step ST3, when there is an interrupt request from the peripheral device 12, the interrupt control circuit 13 issues an interrupt request to the main processor 11.

In step ST4, an interrupt request is sent from the interrupt control circuit 13 to the main processor 11. The details of the processes in the main processor are explained in FIG. 4 below.

In step ST5, the interrupt control circuit 13 of the peripheral circuit 12 reads the interrupt vector from the interrupt vector holding register 15.

In step ST6, the interrupt control circuit 13 sets a vector number to the lower bytes (D7 to D9) of the data bus, and asserts the data and size acknowledge *DSACKx.

In step ST7, the main processor 11 latches the vector number, and negates an address strobe *AS and data strobe *DS.

In step ST8, the interrupt control circuit 13 identifies the negation of the address strobe *AS and data strobe *DS, and negates the data and size acknowledge *DSACKx.

In step ST9, the main processor 11 starts the next cycle, and the process returns to the step ST1.

Figure 4:
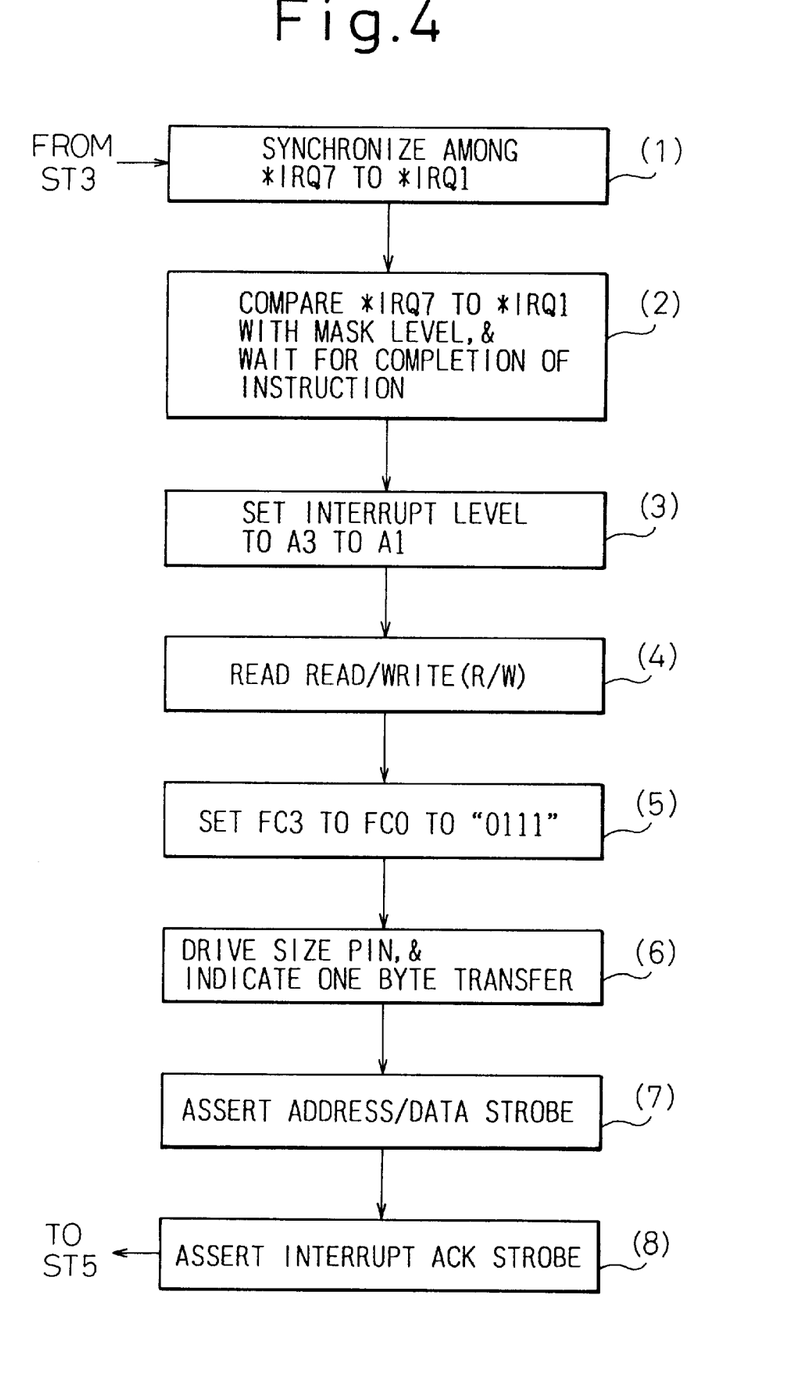
FIG. 4 shows the details of the processes in step ST4 of FIG. 3.

FIG. 4 shows the detail of the processes in step ST4 of FIG. 3. In step ST4, the main processor 11 executes steps (1) to (8). That is, the main processor synchronizes the interrupt request levels *IRQ7 to *IRQ1 (step (1)), and compares the interrupt request levels *IRQ7 to *IRQ1 with a mask level. The highest interrupt request level *IRQ7 indicates the interrupt operation which cannot be masked.

The main processor 11 waits for completion of the instruction which is executed (step (2)). After completion of the instruction, the main processor 11 sets the interrupt request level into the lower addresses A3 to A1, and further, sets the addresses A19 to A16 to $F of the interrupt acknowledge code, and still further, sets A31 to A20, A15 to A4, and A0 to "1" (step (3)).

The main processor sets the read/write (R/W) to the read ("1") (step (4)), sets the function codes FC3 to FC0 to bits "0111" (step (5)), drives the size pin SIZ0, i.e., indicating "one byte transfer" using SIZ0="1" and SIZ1="0" (step (6)). Further, the main processor 11 asserts (i.e., sets to "0") the address strobe *AS and the data strobe *DS (step (7)), and further asserts (i.e., sets to "0") the interrupt acknowledge strobe *IACKx (x=7 to 1) (step (8)). The result of the process in the main processor is sent to the peripheral device 12, and the step ST5 is processed.

In the steps shown in FIGS. 3 and 4, in the initialization just after power-on of the system, the sub-processor 16 sets the interrupt request level into the interrupt request level holding register 14, and sets the interrupt vector into the interrupt vector holding register 15 based on the update command.

After initialization, when the system executes additional function in order to grade up its own system so that the interrupt request level and the interrupt vector must be changed, it is possible to easily change the interrupt request level and the interrupt vector by changing only the initialization program.

Further, during operation of the system, it is possible to change the interrupt request level and the interrupt vector in accordance with the structural conditions.

Still further, it is possible to change the interrupt request level and the interrupt vector by using the sub-processor 16 as shown in FIG. 2. This embodiment has been explained in FIG. 2.

Figure 5:
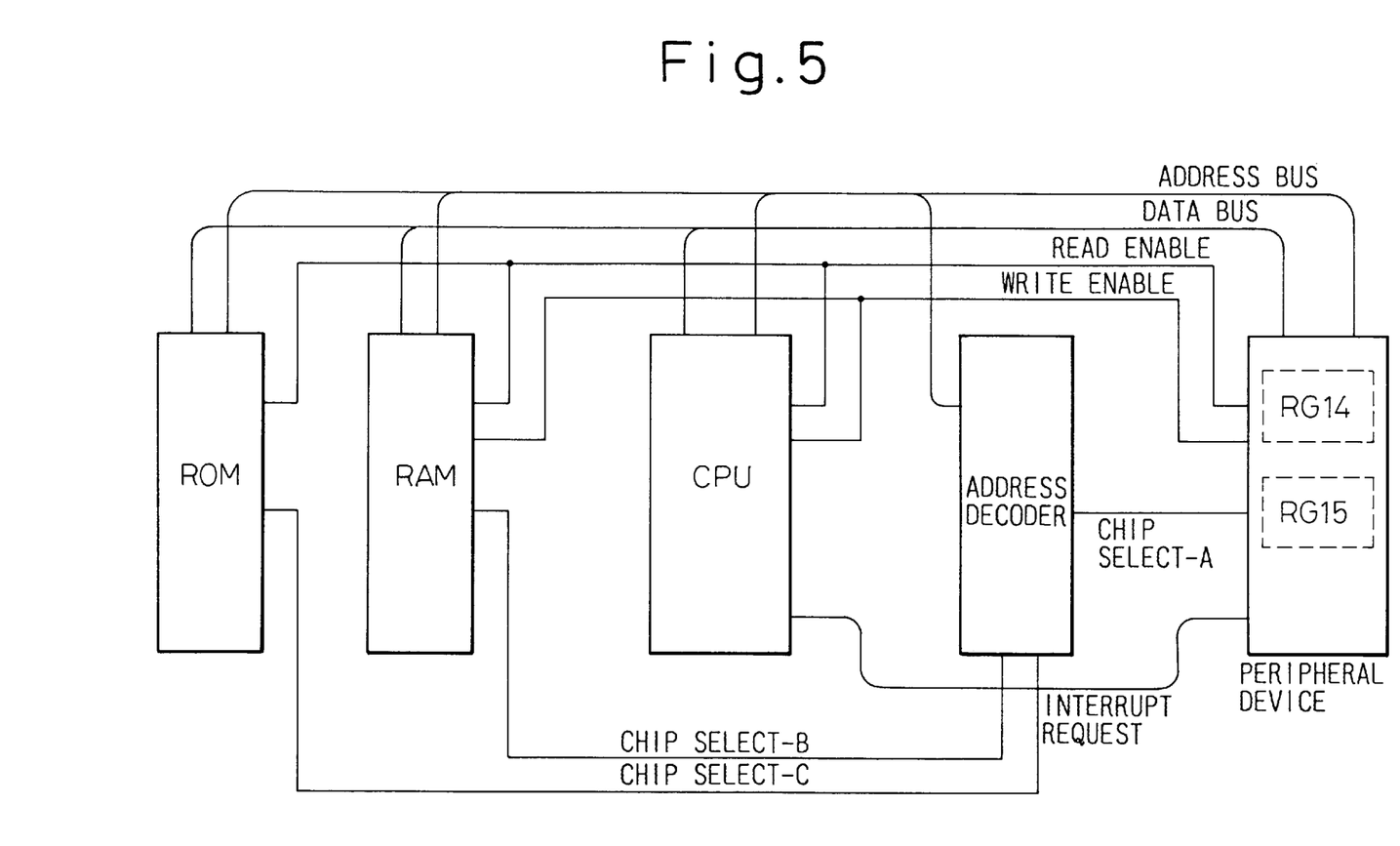
FIG. 5 shows one example of a detailed block diagram of the system using the present invention.

FIG. 5 shows one example of a detailed block diagram of the system using the present invention.

As shown in the drawing, the system is formed by a ROM (read only memory), a RAM (random access memory), a CPU (main processor), an address decoder, and a peripheral device. This structure is used to the rewrite of the interrupt request level and the interrupt vector either during operation or during the initialization of the system.

First, the peripheral device sends the interrupt request to the CPU. The CPU sets an address, which corresponds to the interrupt request level holding register RG14 and the interrupt vector holding register RG15, onto the address bus. Second, the address decoder sets a chip selection-A signal to the peripheral device based on the address on the address bus. Third, the CPU outputs the value to be set into the interrupt request level holding register RG14 and the interrupt vector holding register RG15. Fourth, the CPU asserts a read enable. Finally, the CPU negates the write enable. In this case, a chip selection-B signal is read from the RAM, and a chip selection-C signal is read from the ROM. These signals are sent to the address decoder.

Figure 6:
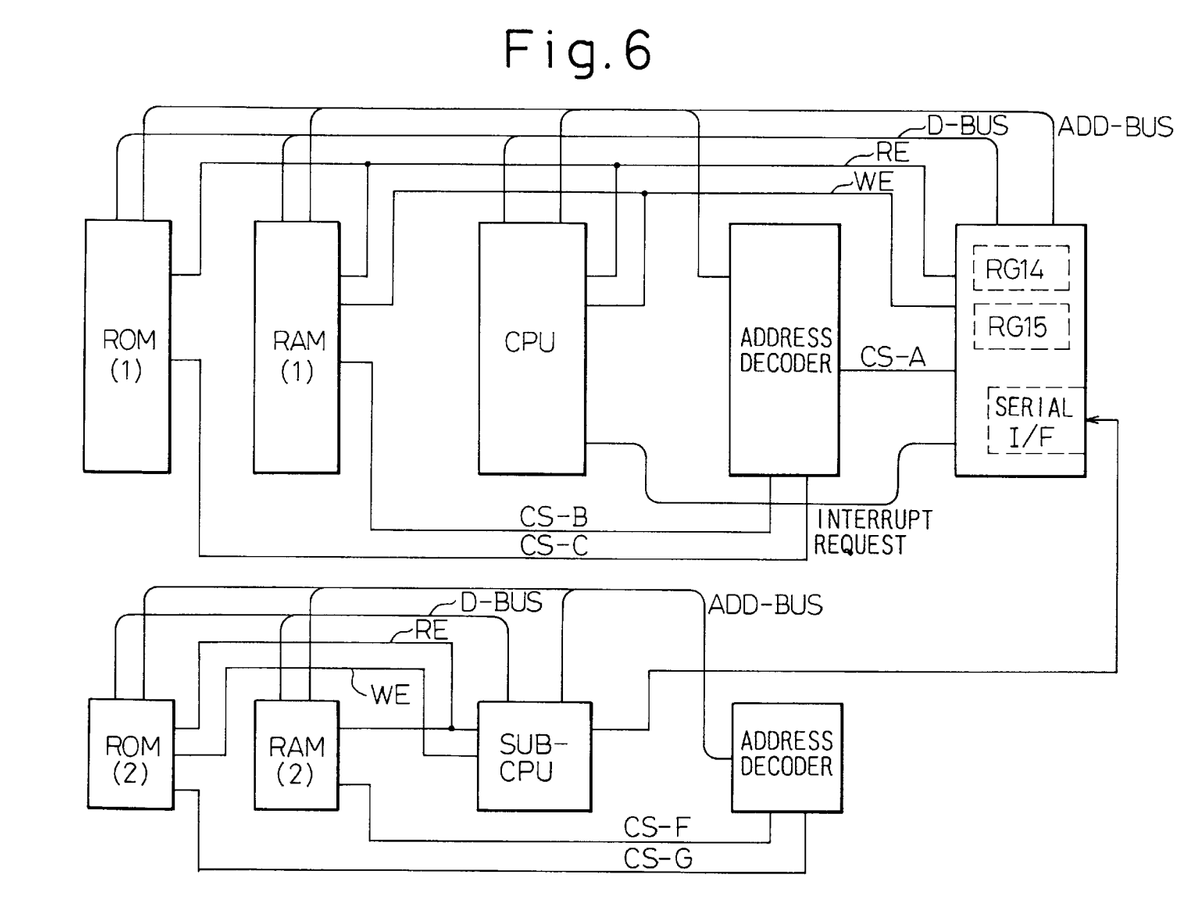
FIG. 6 shows another example of a detailed block diagram of the system using the present invention.

FIG. 6 shows another example of a detailed block diagram of the system using the present invention. As shown in the drawing, the system further includes a sub-CPU (sub-processor) and a corresponding ROM (2), a RAM (2) and an additional address decoder. This structure is used to rewrite the interrupt request level holding register RG14 and the interrupt vector holding register RG15 from the sub-CPU. The peripheral device includes a serial interface (I/F). The sub-CPU rewrites the contents of the interrupt request level holding register RG14 and the interrupt vector holding register RG15. Other steps are the same as the steps shown in FIG. 5.

Figure 7:
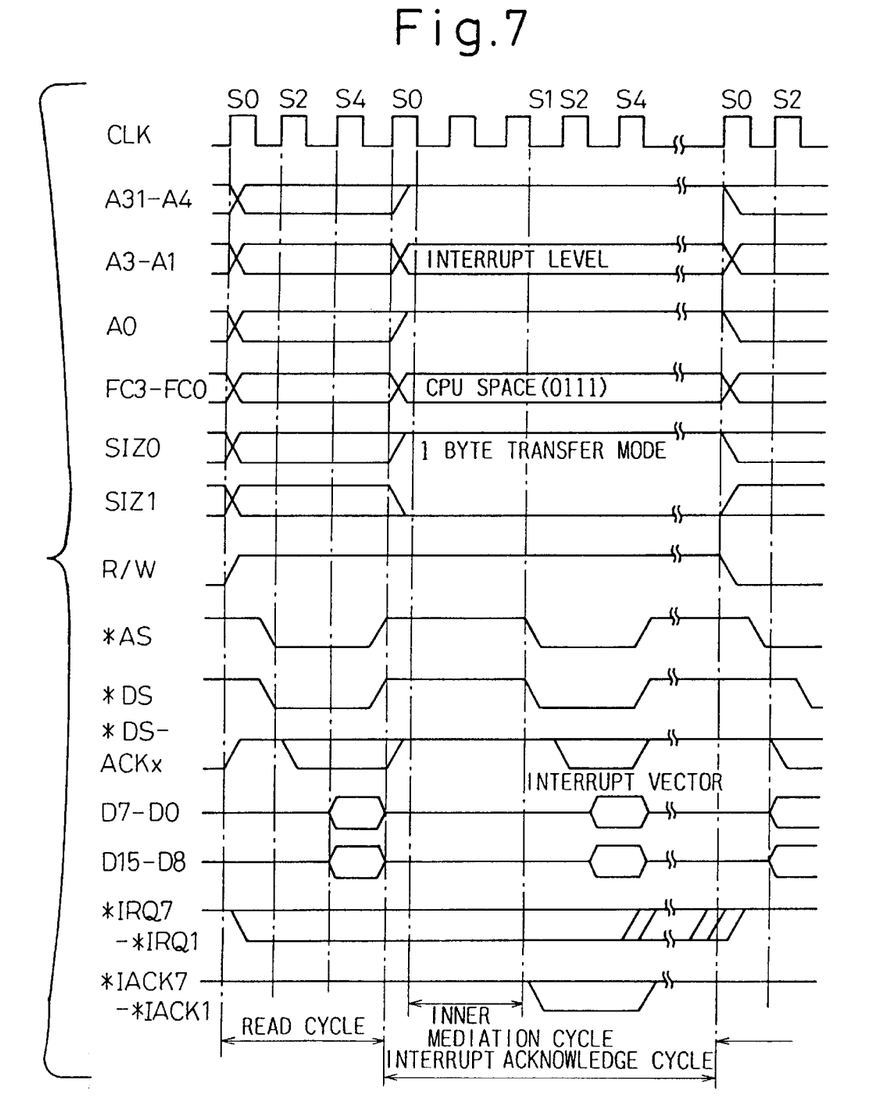
FIG. 7 shows a timing-chart of various signals for explaining the interrupt operation according to the present invention.

FIG. 7 shows a timing-chart of various signals for explaining the interrupt operation according to the present invention. The reference symbols used in FIG. 2 are used for the same components in this drawing.

The interrupt request is generated in the peripheral device 12 in a read cycle having three cycles. The interrupt control circuit 13 sends the interrupt request levels *IRQ7 to *IRQ1 to the main processor 11. In this read cycle, the read/write R/W signal indicates the read state ("1"), and the address strobe *AS and the data strobe *DS are simultaneously set to the assert state ("0"). The main processor 11 sends data on the data bus to the peripheral device 12.

When the read cycle is completed, the addresses A31 to A4 and A0 become "1", and the address bits A3 to A1 indicate the interrupt request level. The function codes FC3 to FC0 are set to "0111" (CPU space), and the transfer size SIZ0 is set to "1" and the SIZ0 is set to "0" to indicate a one byte transfer. After an inner mediation cycle having two cycles, the address strobe *AS and the data strobe *DS are simultaneously set to the assert state ("0").

The main processor 11 asserts the interrupt acknowledges strobes *IACK7 to IACK1, and the peripheral device 12 sets the data and size acknowledge *DSACKx. Further, the peripheral device sends the interrupt vector to the main processor 11 based on the data D7 to D0. The main processor 11 latches the interrupt vector, and simultaneously negates the address strobe *AS and the data strobe *DS ("1"). Further, the peripheral device 12 negates the data and size acknowledge *DSACK and completes the interrupt acknowledge cycle.

What is claimed is:
1. A method for controlling an interrupt from a peripheral device to a processor, the peripheral device including at least an interrupt control means, an interrupt request level holding means, and an interrupt vector holding means; said method comprising the steps of:

(a) updating the contents of said interrupt request level holding means in accordance with software commands from an external device;

(b) updating the contents of said interrupt vector holding means in accordance with the software commands sent from said external device;

(c) reading an interrupt request level from said interrupt request level holding means in said interrupt control means;

(d) issuing the interrupt request level from said interrupt control means to said processor when said peripheral device sends the interrupt to said processor;

(e) performing various processes including synchronization of the interrupt request level, in said processor and sending results of processes from said processor to said peripheral devices;

(f) reading an interrupt vector from said interrupt vector holding means in said interrupt control means, and setting a vector number to lower byte of data to the interrupt vector in order to set data and size acknowledge to said processor;

(g) notifying the interrupt vector from said interrupt control means to said processor;

(h) latching the vector number from said interrupt control means and negating address and data strobes in said processor;

(i) negating the data and size acknowledge in said interrupt control means; and (j) starting next cycle of the interrupt in said processor.

2. A method for controlling an interrupt from a peripheral device to a processor, as claimed in claim 1, wherein, in said processor, the step (e) further comprises;

(1) synchronizing the interrupt request level;

(2) comparing the interrupt request level with a mask level, and waiting for completion of an instruction in progress;

(3) setting the interrupt request level in a lower address;

(4) reading a read/write level indicating the direction of transfer of data;

(5) setting function codes to "0111" in the interrupt;

(6) setting the transfer size to "01" in order to indicate one-byte transfer in the interrupt;

(7) setting address and data strobes to "0"; and (8) setting an interrupt acknowledge strobe to "0".

3. A method for controlling an interrupt from a peripheral device to a processor, the peripheral device holding at least an interrupt request level and an interrupt vector, said method comprising the steps of:

updating the contents of the interrupt request level held in the peripheral device and the interrupt vector in accordance with a software command in response to a change of conditions of the processor from an external device which observes the conditions; and notifying the processor of said updated contents of the interrupt request level and the interrupt vector from the peripheral device when the peripheral device performs the interrupt to the processor.

4. A method for controlling an interrupt from a peripheral device to a processor, as claimed in claim 1 or 3, wherein, said external device is a sub-processor.

* * * * *